United States Patent [19]

Mielke

[11] Patent Number: 4,756,240
[45] Date of Patent: Jul. 12, 1988

[54] PISTON PIN

[75] Inventor: Siegfried Mielke, Neckarsulm, Fed. Rep. of Germany

[73] Assignee: Kolbenschmidt Aktiengesellschaft, Neckarsulm, Fed. Rep. of Germany

[21] Appl. No.: 876,062

[22] Filed: Jun. 19, 1986

[30] Foreign Application Priority Data

Jun. 19, 1985 [DE] Fed. Rep. of Germany ....... 3521796

[51] Int. Cl.4 .............................................. F16J 1/14
[52] U.S. Cl. ...................... 92/187; 403/150
[58] Field of Search ................. 92/187–191; 403/150–156

[56] References Cited

U.S. PATENT DOCUMENTS

| | | | |
|---|---|---|---|
| 1,568,209 | 1/1926 | Collier | 403/155 |
| 1,859,360 | 5/1932 | Freer | 403/150 X |
| 2,703,264 | 3/1955 | Pitner | 92/187 |

Primary Examiner—William E. Wayner
Attorney, Agent, or Firm—Sprung Horn Kramer & Woods

[57] ABSTRACT

A piston pin with a bore extending through it. To save weight and to optimize the shape of the pin with respect to accommodating stress, the diameter of the bore is increased to 75 to 90% of the outside diameter of the piston pin and reinforcing ribs are positioned in the bore in the vicinity of the inner edge of each hub.

5 Claims, 1 Drawing Sheet

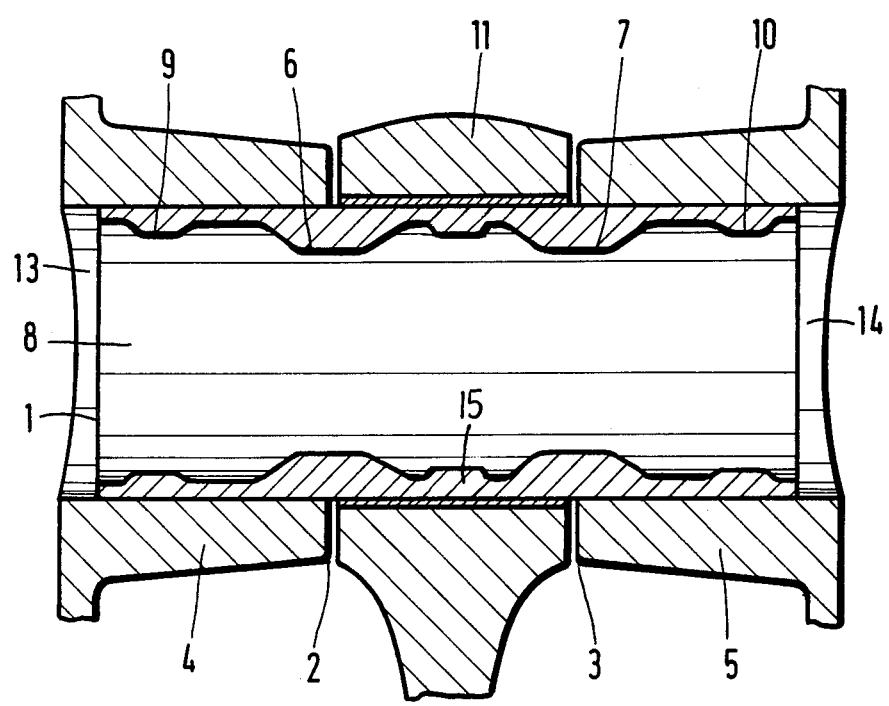

PISTON PIN

BACKGROUND OF THE INVENTION

The present invention relates to a piston pin with a bore extending through it.

A piston pin, which is the force-transmission link between a piston and a connecting rod, receives bending, elliptical-deformation, and, in specific cross-sections, shearing stresses from the gas and mass forces that engage it, to the extent that both it and its hubs deform elastically. The contact surfaces between the pin and its hubs, although cylindrical when unstressed, bend and tilt, creating local surface-pressure peaks. In conjunction with the tensile force that acts along the circumference of the pin hubs, this stress can exceed the long-term resistance to vibration on the part of the piston material and lead to what are called hub-gap cracks: fatigue cracking in the apex of the hubs. This can only be prevented with low-deformation piston pins, pins, that is, with thick walls. This solution, however, runs counter to the attempt to keep the dimensions of the mechanism driven by the internal-combustion engine as small as possible and its design as simple as possible.

SUMMARY OF THE INVENTION

The object of the present invention is to provide a piston pin with a bore extending through it with a shape that will accept stress as optimally as possible in order to increase the strength and life of the pin hubs as much as possible with minimal weight.

This object is attained in accordance with the invention in a piston pin with a bore extending through it by an improvement wherein the diameter of the bore is 75 to 90% of the outer diameter of the pin and wherein a reinforcing rib is positioned inside the bore in the vicinity of the inner edge of each hub. A piston pin with a comparatively thin wall of this type will readily support tensile and compressive stresses parallel to its axis. The stresses superimposed on these stresses and deriving from shearing stress and elliptical deformation are accommodated by the reinforcing ribs on the inner surface of the bore.

Optimal operating reliability will be attained when the distance between the midlines of the reinforcing ribs equals the inside distance between the hubs of the pin.

In a preferred embodiment, the diameter of the bore in the vicinity of the reinforcing ribs will be no more than 0.75 times the outside diameter of the pin. Each reinforcing rib is 10 to 30% and preferably 15 to 25% as wide as the pin is long.

It is practical from the aspect of manufacturing technology for the reinforcing ribs to be trapezoidal in profile with rounded edges and transitions.

Particularly highly stressed piston-pin bearings will require additional reinforcing ribs between and outside the two main reinforcing ribs. The additional reinforcing ribs can be smaller than the main reinforcing ribs and they can be positioned at the midline of the piston pin and/or 5 to 15 mm from each end.

The shape of a piston pin with a bore extending through it in accordance with the invention makes it possible to reduce the weight of the pin by up to 40% in terms of conventional piston pins without detriment to the strength and life of the hubs even with highly variable limiting conditions.

Some preferred embodiments of the invention will now be described with reference to the attached drawing, wherein

BRIEF DESCRIPTION OF THE DRAWINGS

The FIGURE is a longitudinal section through a piston pin according to the invention.

DETAILED DESCRIPTION OF THE PREFERRED EMBODIMENTS

A cylindrical piston pin 1 is seated in hubs 4 and 5 with head 11 of a connecting rod disposed therebetween. Hubs 4 and 5 have cylindrically bored eyes 13, 14 and pin 1 has a bore 8 extending therethrough. Pin 1 has reinforcing ribs 6 and 7 on the inside in the vicinity of the inside edges 2 and 3 of hubs 4 and 5. Each rib is trapezoidal in profile with rounded edges. The bore 8 that extends through piston pin 1 has a diameter of 16 mm, tapering down to 13 mm in the vicinity of each reinforcing rib 6 and 7. Additional reinforcing ribs 9, 10 are positioned with their midline 5 mm from each end of piston pin 1. At the midline of ribs 9, 10, the diameter of the bore is 15 mm. Additionally, a similar dimensioned rib 15 can be positioned at the midline of the piston pin. This makes it possible to save about 30 grams of weight in a piston pin with an outside diameter of 19 mm. Piston pin 1 is inserted with the head 11 of the connecting rod in an incompletely illustrated piston 12 in eyes 13 and 14.

A piston provided with a piston pin 1 designed in accordance with the invention has been subjected to long-term testing in an internal-combustion engine. The piston is composed of an aluminum alloy of the typ AlSi 12 CuNiMg and the pin is composed of a steel of the typ 16 MnCr 5. No wear was evident on the piston pin or on the pin hubs after about 300 hours. No change in the shape of the piston pin designed in accordance with the invention was observed.

It will be appreciated that the instant specification and claims are set forth by way of illustration and not limitation, and that various modifications and changes may be made without departing from the spirit and scope of the present invention.

What is claimed is:

1. In a piston having hubs with inner edges and a cylindrical piston pin with a bore extending therethrough, the improvement wherein the diameter of the bore is 75 to 90% of the outer diameter of the pin and the pin has main reinforcing ribs positioned inside the bore in the vicinity of the inner edges of the hubs, wherein the distance between midlines of the main reinforcing ribs equals the distance between the inner edges of the hubs, wherein the diameter of the bore in the vicinity of the reinforcing ribs is no more than 0.75 times the outside diameter of the pin, wherein the width of each main reinforcing rib is 10 to 30% of the length of the pin and the pin has additional reinforcing ribs positioned 5 to 15 mm from each end of the pin.

2. The piston as in claim 1, wherein the width of each rib is 15 to 25% of the length of the pin.

3. The piston as in claim 1, wherein the main reinforcing ribs are trapezoidal in profile with rounded edges and transitions.

4. The piston as in claim 1, further comprising an additional reinforcing rib positioned at the midline of the piston pin.

5. The piston as in claim 1 or 4, wherein each additional reinforcing rib is smaller in profile than the main reinforcing ribs.

* * * * *